(12) United States Patent
Dingli et al.

(10) Patent No.: US 11,673,565 B1
(45) Date of Patent: Jun. 13, 2023

(54) RECOVERABLE FAIL-SAFE TRAJECTORY

(71) Applicant: PlusAI, Inc., Santa Clara, CA (US)

(72) Inventors: Robert Joseph Dingli, Cupertino, CA (US); Wenbin Wang, Cupertino, CA (US); Mohammadhussein Rafieisakhaei, Foster City, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/855,451

(22) Filed: Jun. 30, 2022

(51) Int. Cl.
*B60W 50/029* (2012.01)
*B60W 50/02* (2012.01)
*B60W 50/14* (2020.01)
*B60W 60/00* (2020.01)

(52) U.S. Cl.
CPC ...... *B60W 50/029* (2013.01); *B60W 50/0205* (2013.01); *B60W 50/14* (2013.01); *B60W 60/0011* (2020.02); *B60W 60/0015* (2020.02); *B60W 2050/0292* (2013.01); *B60W 2556/25* (2020.02); *B60W 2556/30* (2020.02)

(58) Field of Classification Search
CPC ........... B60W 50/029; B60W 60/0015; B60W 60/0011; B60W 50/0205; B60W 50/14; B60W 2556/25; B60W 2556/30; B60W 2050/0292
See application file for complete search history.

(56) References Cited

U.S. PATENT DOCUMENTS

| | | | |
|---|---|---|---|
| 9,008,890 B1 * | 4/2015 | Herbach | G07C 5/008 340/436 |
| 2017/0199523 A1 * | 7/2017 | Barton-Sweeney | B60W 30/0956 |

* cited by examiner

*Primary Examiner* — Kenneth J Malkowski
*Assistant Examiner* — Andrew J Cromer
(74) *Attorney, Agent, or Firm* — Kilpatrick Townsend & Stockton LLP

(57) ABSTRACT

Embodiments provide a vehicle computer coupled to a vehicle. The vehicle computer may be configured to compute (e.g., generate) a first (e.g., regular, main) trajectory and a second (e.g., fail-safe, minimal risk maneuver) trajectory for the vehicle. Embodiments may provide a fault detection interval during which the second trajectory may be activated due to missing updated trajectory input. Embodiments may also provide a recovery detection interval during which an updated regular trajectory may be generated and followed instead of the fail-safe trajectory if a valid trajectory update is received. Accordingly, embodiments allow for an early activation of a fail-safe trajectory compared to conventional systems, while also allowing the system to recover (e.g., revert back to a modified version of the first trajectory) if a valid trajectory update is received during a recovery detection interval.

20 Claims, 9 Drawing Sheets

```
                                                                                                    400

┌─────────────────────────────────────────────────────────────────────────────────────────────────┐
│ Receive data associated with a first trajectory and data associated with a second trajectory,    │
│ wherein the first trajectory and the second trajectory are updated a plurality of times in one   │
│ second                                                                                           │
│ 402                                                                                              │
└─────────────────────────────────────────────────────────────────────────────────────────────────┘
                                              │
                                              ▼
┌─────────────────────────────────────────────────────────────────────────────────────────────────┐
│ Generate a first set of commands for a vehicle to follow the first trajectory, and a second set  │
│ of commands for the vehicle to follow the second trajectory                                      │
│ 404                                                                                              │
└─────────────────────────────────────────────────────────────────────────────────────────────────┘
                                              │
                                              ▼
┌─────────────────────────────────────────────────────────────────────────────────────────────────┐
│ Transmit the first set of commands to one or more actuators of the vehicle for the vehicle to    │
│ follow the first trajectory                                                                      │
│ 406                                                                                              │
└─────────────────────────────────────────────────────────────────────────────────────────────────┘
                                              │
                                              ▼
┌─────────────────────────────────────────────────────────────────────────────────────────────────┐
│ Determine that updated data associated with the first trajectory is missing at a first time      │
│ 408                                                                                              │
└─────────────────────────────────────────────────────────────────────────────────────────────────┘
                                              │
                                              ▼
┌─────────────────────────────────────────────────────────────────────────────────────────────────┐
│ Provide the second set of commands to the vehicle for the vehicle to follow the second           │
│ trajectory at a second time after the first time                                                 │
│ 410                                                                                              │
└─────────────────────────────────────────────────────────────────────────────────────────────────┘
                                              │
                                              ▼
┌─────────────────────────────────────────────────────────────────────────────────────────────────┐
│ When updated data associated with the first trajectory is received at a third time before a      │
│ fourth time after the second time: control the vehicle to follow an updated first trajectory     │
│ instead of the second trajectory                                                                 │
│ 412                                                                                              │
└─────────────────────────────────────────────────────────────────────────────────────────────────┘
                                              │
                                              ▼
┌─────────────────────────────────────────────────────────────────────────────────────────────────┐
│ When updated data associated with the first trajectory is not received before the fourth time:   │
│ generate an alert at the third time while providing the second set of commands to the vehicle    │
│ for the vehicle to follow the second trajectory                                                  │
│ 414                                                                                              │
└─────────────────────────────────────────────────────────────────────────────────────────────────┘

Receive, by a first processor of a vehicle computer, data associated with a first trajectory and data associated with a second trajectory, wherein the first trajectory and the second trajectory are updated a plurality of times in one second
702

↓

Generate, by the first processor of the vehicle computer, a first set of commands for a vehicle to follow the first trajectory, and a second set of commands for the vehicle to follow the second trajectory
704

↓

Transmit, by the first processor of the vehicle computer via a safety processor of the vehicle computer, the first set of commands to one or more actuators of the vehicle for the vehicle to follow the first trajectory
706

↓

Determine, by the safety processor of the vehicle computer, that a predetermined condition occurred for terminating the first trajectory, and switching to the second trajectory
708

↓

Provide, by the safety processor of the vehicle computer, the second set of commands to the vehicle for the vehicle to follow the second trajectory
710

↓

Receive, by the safety processor of the vehicle computer, sensor data while the vehicle follows the second trajectory
712

↓

Modify, by the safety processor of the vehicle computer, the second trajectory based on the sensor data to obtain a modified second trajectory that avoids a hazard on the second trajectory
714

FIG. 7

RECOVERABLE FAIL-SAFE TRAJECTORY

BACKGROUND

Various vehicles employ computing means to aid automated vehicle operation. Recently, in the automotive industry, much of the focus is on making a vehicle operate in an autonomous mode in a safe manner. A vehicle computer of such a vehicle may include a planner module and a control module. The planner module may plan a route from a source to a destination based on certain considerations. The planner module may generate a regular trajectory and a fail-safe trajectory at any given time. Unless a fault is detected, the control module may control the vehicle to follow the regular trajectory. When a fault is detected, conventional systems wait for a predetermined fault detection interval for the vehicle to recover from the faulty state. If the vehicle does not recover from the faulty state or if a corrective signal is not received prior to the expiration of the fault detection interval, the control module switches the vehicle to follow the fail-safe trajectory and generates an alert at the same time. The alert may be a driver alert asking the driver to assume control of the vehicle.

For exemplary conventional systems, the fault detection interval is about 2 seconds. A conventional planner module is normally able to provide an updated trajectory, including a fail-safe trajectory, for example every 100 ms. A 1 second latency in the planner module output is relatively common (e.g., once or twice per drive), and a two second latency would be considered rare but possible. In case of a mere latency that may be cleared (or corrected), the non-recoverable nature of the fail-safe mode may be a problem. Similarly, in case of an actual fault, the activation of the fail-safe mode at the end of the entire fault detection interval may be problematic. If a vehicle (e.g., an autonomous truck) drives for eight hours, the calculations are being done millions and millions of times during a single journey of the vehicle. Even when the latency reaches a threshold once in several million calculations, the latency results in one problem per day, which is too many.

The longer the fault detection interval (for example, 2 seconds), the more opportunity for the planner module to recover and the lower the chance of triggering the fail-safe trajectory. However, a vehicle at 55 mph will travel nearly 25 meters every second. If the fault detection interval is too long, the vehicle will travel further before coming to a safe stop in the event of the planner module excessive latency or fault. Accordingly, every second where no trajectory update is received would have a significant impact on the trajectory of the vehicle. The conventional systems will not revert to normal control once the fail-safe trajectory is triggered, even if a valid planner module output is received or the fault is cleared.

Embodiments are directed to addressing these and other problems, individually and collectively.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments provide a vehicle computer coupled to a vehicle. The vehicle computer may be configured to compute (e.g., generate) a first (e.g., regular, main) trajectory and a second (e.g., fail-safe, minimal risk maneuver) trajectory for the vehicle. Embodiments may provide a fault detection interval during which the second trajectory may be activated due to missing updated trajectory input. Embodiments may also provide a recovery detection interval during which an updated regular trajectory may be generated and followed instead of the fail-safe trajectory if a valid trajectory update is received. Accordingly, embodiments allow for an early activation of a fail-safe trajectory compared to conventional systems, while also allowing the system to recover (e.g., revert back to a modified version of the first trajectory) if a valid trajectory update is received during a recovery detection interval.

Various embodiments provide a method may include receiving, by a control module of a vehicle computer, data associated with a first trajectory and data associated with a second trajectory, where the first trajectory and the second trajectory are updated a plurality of times in one second. The method may in addition include generating, by the control module of the vehicle computer, a first set of commands for a vehicle to follow the first trajectory, and a second set of commands for the vehicle to follow the second trajectory. The method may also include transmitting, by the control module of the vehicle computer, the first set of commands to one or more actuators of the vehicle for the vehicle to follow the first trajectory. The method may further include determining, by the control module of the vehicle computer, that updated data associated with the first trajectory is missing at a first time. The method may in addition include providing, by the control module of the vehicle computer, the second set of commands to the vehicle for the vehicle to follow the second trajectory at a second time after the first time. The method may also include when updated data associated with the first trajectory is received at a third time before a fourth time after the second time: controlling, by the control module of the vehicle computer, the vehicle to follow an updated first trajectory instead of the second trajectory. The method may further include when updated data associated with the first trajectory is not received before the fourth time: generating, by the control module of the vehicle computer, an alert at the third time while providing the second set of commands to the vehicle for the vehicle to follow the second trajectory.

Embodiments provide a vehicle may include a vehicle computer. The vehicle computer may include one or more processors and a computer-readable medium storing instructions that, when executed by the one or more processors, cause the one or more processors to: receive data associated with a first trajectory and data associated with a second trajectory, where the first trajectory and the second trajectory are updated a plurality of times in one second. The instructions, when executed by the one or more processors, may also cause the one or more processors to generate a first set of commands for the vehicle to follow the first trajectory, and a second set of commands for the vehicle to follow the second trajectory. The instructions, when executed by the one or more processors, may also cause the one or more processors to transmit the first set of commands to one or more actuators of the vehicle for the vehicle to follow the first trajectory. The instructions, when executed by the one or more processors, may also cause the one or more processors to determine that updated data associated with the first trajectory is missing at a first time. The instructions, when executed by the one or more processors, may also cause the one or more processors to provide the second set of commands to the vehicle for the vehicle to follow the second trajectory at a second time after the first time. The instructions, when executed by the one or more processors, may also cause the one or more processors to, when updated data associated with the first trajectory is received at a third time before a fourth time after the second time: control the vehicle to follow an updated first trajectory instead of the second trajectory. The instructions, when executed by the one or more processors, may also cause the one or more processors to, when updated data associated with the first trajectory is not received before the fourth time: generate an alert at the fourth time while providing the second set of commands to the vehicle for the vehicle to follow the second trajectory.

Embodiments provide a non-transitory computer-readable medium storing instructions may include instructions to receive data associated with a first trajectory and data associated with a second trajectory, where the first trajectory and the second trajectory are updated a plurality of times in one second. Non-transitory computer-readable medium storing instructions may in addition include instructions to generate a first set of commands for a vehicle to follow the first trajectory, and a second set of commands for the vehicle to follow the second trajectory. Instructions may also include transmitting the first set of commands to one or more actuators of the vehicle for the vehicle to follow the first trajectory. Instructions may further include determining that updated data associated with the first trajectory is missing at a first time. Instructions may in addition include providing the second set of commands to the vehicle for the vehicle to follow the second trajectory at a second time after the first time. Instructions may also include when updated data associated with the first trajectory is received at a third time before a fourth time after the second time: controlling the vehicle to follow an updated first trajectory instead of the second trajectory. Instructions may further include when updated data associated with the first trajectory is not received before the fourth time: generate an alert at the fourth time while providing the second set of commands to the vehicle for the vehicle to follow the second trajectory.

Further details regarding embodiments of can be found in the Detailed Description and the Figures.

BRIEF DESCRIPTION OF THE DRAWINGS

FIG. 4 illustrates a flowchart for implementing a fault detection interval for taking a preventative action and a recovery detection interval for generating an alert, according to various embodiments.

FIG. 7 illustrates a flowchart for receiving additional low-resolution sensor data at a safety processor and modifying a minimal risk maneuver by the safety processor, according to various embodiments.

DETAILED DESCRIPTION

Figure 1:
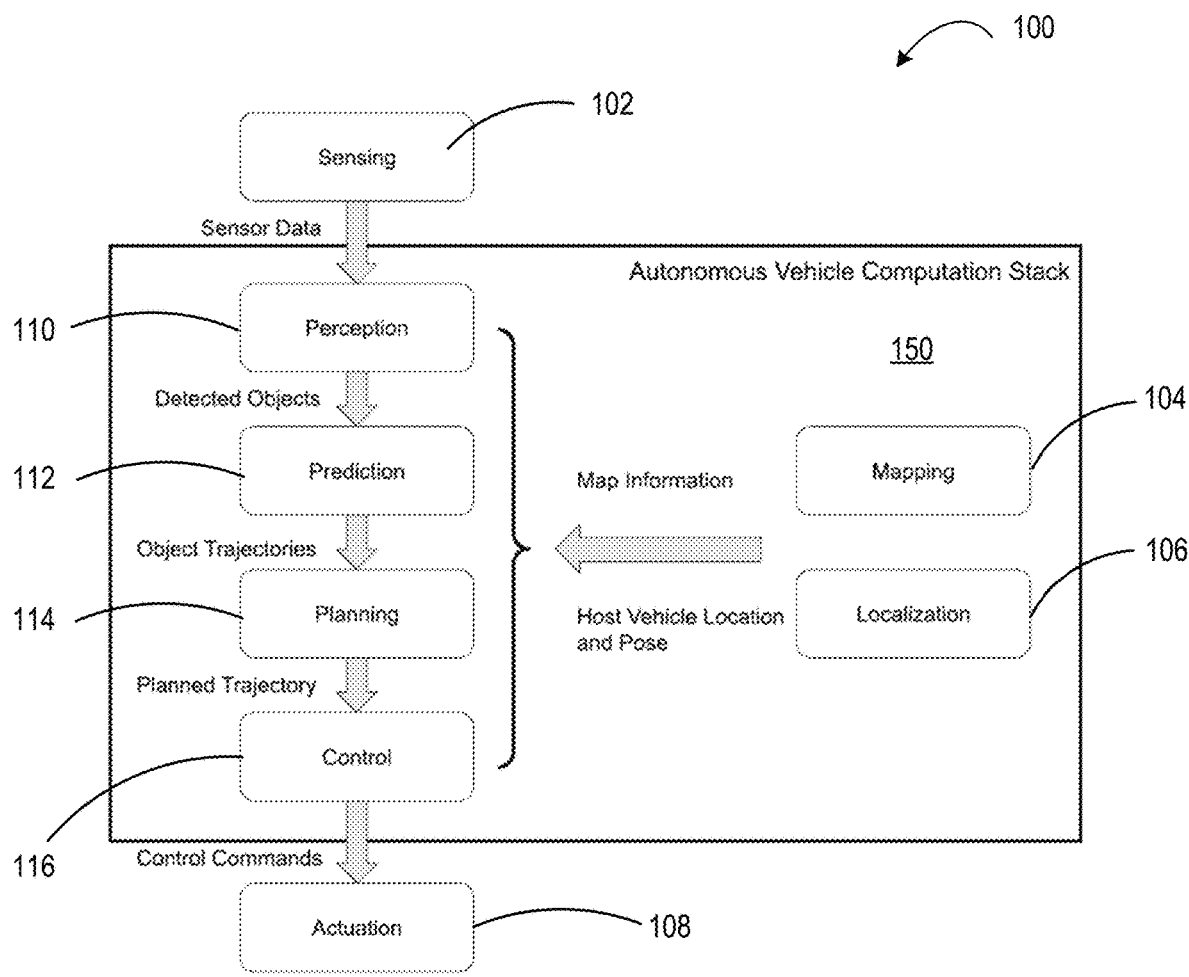
FIG. 1 illustrates components of an exemplary vehicle computer for an autonomous vehicle, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide a vehicle computer coupled to a vehicle. The vehicle computer may be configured to compute (e.g., generate) a first (e.g., regular, main) trajectory and a second (e.g., fail-safe, minimal risk maneuver) trajectory for the vehicle. Embodiments may provide a fault detection interval during which the second trajectory may be activated due to missing updated trajectory input. Embodiments may also provide a recovery detection interval during which an updated regular trajectory may be generated and followed instead of the fail-safe trajectory if a valid trajectory update is received. Accordingly, embodiments allow for an early activation of a fail-safe trajectory compared to conventional systems, while also allowing the system to recover (e.g., revert back to a modified version of the first trajectory) if a valid trajectory update is received during a recovery detection interval.

Prior to discussing embodiments, some terms can be described in further detail.

As used herein, a "trajectory" may refer to a sequence of sequence of desired system state (position, pose, speed etc.) in future time. A control module of a vehicle computer may receive the trajectory and generate instantaneous commands or a vector of commands as a function of time. The commands may include steering commands and acceleration/deceleration commands among others.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors (e.g., one or more main processors, at least one safety processor) and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

Recoverable Fail-Safe Fault Management

Embodiments provide a vehicle computer coupled to a vehicle (e.g. a car, a bus, a truck with one or more trailers coupled thereto, or a semitruck). FIG. 1 provides a block diagram of an exemplary vehicle computer 100, according to various embodiments. The vehicle computer 100 may include a main computation stack 150 including one or more first (e.g., main or primary) processors. The main computation stack 150 may comprise one or more modules, including but not limited to, a perception module 110, a prediction module 112, a planning/planner module 114, and a control module 116.

The main computation stack 150 may receive inputs (e.g., sensor data) from one or more input devices 102. According to various embodiments, the input devices 102 may include one or more of a radar sensor, a light detection and ranging (lidar) sensor, a camera, computer vision, a Global Positioning System (GPS) sensor, etc. The sensor data may be provided to the perception module 110 that may identify one or more objects in the input data. The input data and the identified objects may then be provided to the prediction module 112 that may predict trajectories of the identified objects, so that the planner module 114 may determine one or more trajectories for the vehicle that would avoid the stationary or moving objects based on the input data from the prediction module 112. The one or more trajectories planned by the panning module 114 may be provided to the control module 116, which would then control one or more actuators 108 of the vehicle to have the vehicle advance in accordance with at least one of the one or more trajectories.

According to various embodiments, one or more of the perception module 110, the prediction module 112, the planning module 114 and/or the control module 116 may also receive mapping data 104 and/or localization data 106 for improved trajectory generation. The modules may calculate their respective outputs based on the mapping data 104 and/or localization data 106, in addition to the inputs received from the input devices 102.

In some embodiments, the planner module 114 may determine a first trajectory (e.g., an original, regular or main trajectory) and a second trajectory (e.g., a fail-safe trajectory). When the system functions in a default or normal mode, the vehicle may be controlled to follow the first trajectory. When a predetermined condition is met (e.g., a fault, a latency or an anomaly is detected), the vehicle may be controlled to follow the second trajectory instead of the first trajectory. According to various embodiments, the second trajectory may bring the vehicle to a full and safe stop within a predetermined amount of time. The predetermined amount of time may depend on the speed of the vehicle at the time when the fault is detected.

If a fault is detected a first time, the system may wait for a predetermined amount of time before corrective action is taken (e.g., before the vehicle is switched to the second trajectory). The predetermined amount of time may be referred as a fault detection interval.

For exemplary conventional systems, the fault detection interval is about 2 seconds. During the fault detection interval, the system is given a chance to recover from the faulty state. At the end of the fault detection interval, conventional systems take two actions at substantially the same time: (1) switch the vehicle to the fails safe trajectory and (2) generate an alert (e.g., alert a driver of the vehicle if a driver is present). For example, a conventional planner module is normally able to provide an updated trajectory, including a fail-safe trajectory, every 100 ms. For example, a 1 second latency in planner module output is relatively common (e.g., once or twice per drive), and a two second latency would be considered rare but possible. If a vehicle (e.g. an autonomous truck) drives for eight hours, the calculations are being done millions and millions of times during a single journey of the vehicle. Even when the latency reaches a threshold once in several million calculations, the latency results in one problem per day, which is too many.

Embodiments provide a method to manage excessive latency (e.g., 2 seconds or more) in the output of the planner module 114 of the vehicle computer 100. Embodiments provide a fail-safe response earlier than conventional techniques while also allowing the system to recover from the fail-safe mode without generating an alert (e.g., an alert to a driver of the vehicle) during a recovery detection interval. Accordingly, the system may recover from the fail-safe mode when the original fault clears, or an updated data is received from the path planner module before a predetermined point in time (e.g., before the end of the recovery detection interval that follows the fault detection interval). Thus, embodiments provide the fail-safe response at an earlier time in case of a significant planner module latency or fault with the additional benefit of a recovery option for instances when the planner module updates in time or the original fault clears.

Embodiments manage a range of faults that trigger the fail-safe planning trajectory, such as a minimum risk maneuver (MRM) trajectory. There is a reasonable chance of excessive latency in the publishing of updated planning trajectories. The latency may be due to high computational load or problems upstream of the planner module. There are also a range of faults which would ordinarily trigger a fail-safe response which may be recoverable given a short time period. Embodiments strike a balance between reacting to a lack of updated planning trajectory or other fault cases and the inconvenience caused by excessive fail-safe maneuvers. Excessive fail-safe maneuvers will render the system unreliable and untrustworthy and introduce secondary safety hazards.

Figure 2:
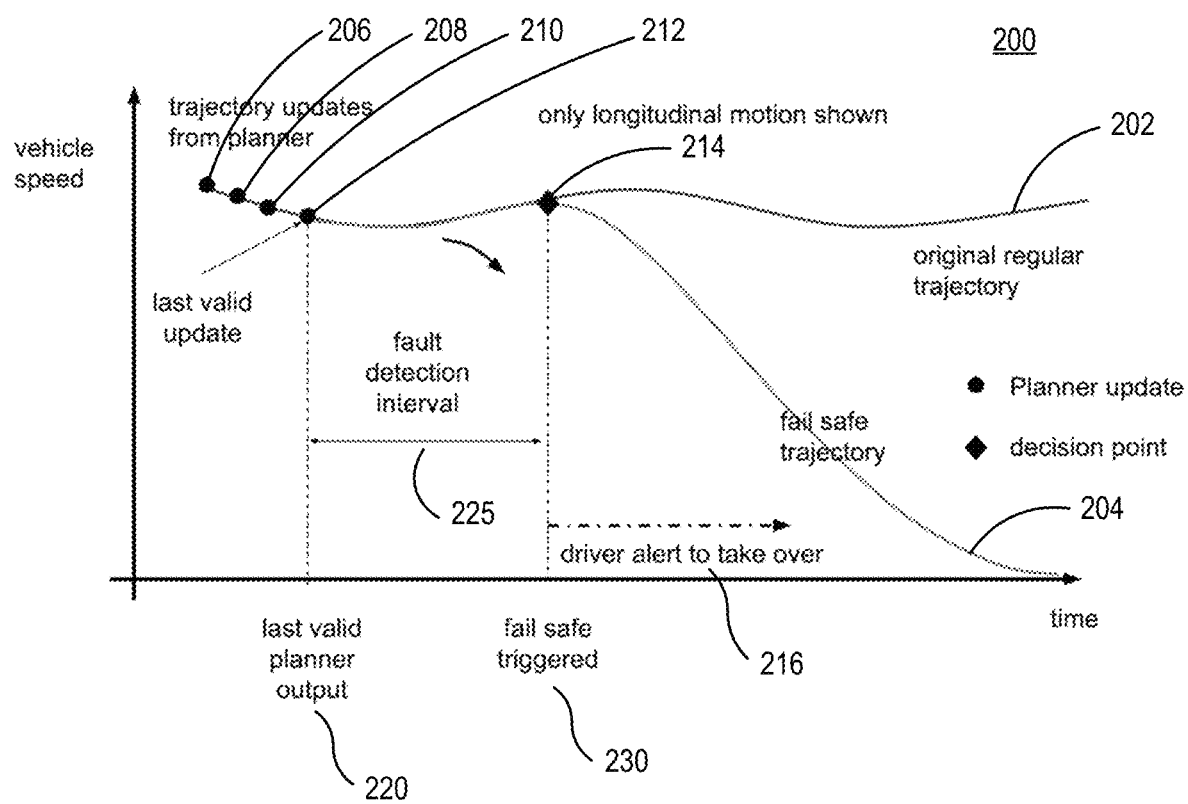
FIG. 2 illustrates a first trajectory and a second trajectory generated by a planner module of a vehicle computer along with a conventional fault detection interval.

Referring now to FIG. 2, a conventional trajectory selection strategy 200 of a vehicle computer is shown. The planner module publishes a regular trajectory 202 and a fail-safe trajectory 204 at every update cycle. The trajectories are for the next few seconds of operation. The control module converts the trajectory into control signals for the vehicle actuators. The control module receives regular trajectory updates 206, 208, 210, 212 from the planner module. According to exemplary embodiments, the trajectory updates 206, 208, 210, 212 may be generated every hundred milliseconds or ten times every second. The control module calculates the control signals using the trajectory updates 206, 208, 210, 212. According to various embodiments, the control module may not be real-time (or deterministic) controller and therefore there may be a latency in calculations. While following the regular trajectory 202 (e.g. the first trajectory), if the control module does not receive a valid updated trajectory from the planner module during the fault detection interval 225, the conventional control module may determine that there is a fault or an above-average latency in the system. The conventional control module may switch to the fail-safe trajectory 204, as shown at decision point 214. Any trajectory updates received after the decision point 214 will not be acted upon as the system is already put is a fail-safe mode.

Once the control module detects a fault (e.g. such as a missing updated trajectory) at a first time 220, the control module may wait for the system to recover from the faulty state during the fault detection interval 225 before taking an action (e.g., switching to the second trajectory and generating an alert). If no updated is received or the fault is not removed otherwise, the control module switches to the fail-safe trajectory at the end of the fault detection interval 225 (e.g., at the second time 230). At the same time (e.g., at the second time 230), an alert 216 is generated for the driver to take over the control of the vehicle. That is, in conventional systems, the driver is alerted to take over once the fail-safe trajectory is triggered. The fail-safe trajectory 204 follows the regular trajectory 202 for at least the duration of the fault detection interval 225 and then deviates from the regular trajectory 202 to briskly slow the vehicle to a stop in lane. In conventional systems, the fail-safe trajectory assumes that the scenario does not change significantly and the system will not revert to normal control even if a valid planner module output is received after the second time 230 or the fault is cleared.

According to various embodiments, there is a spread of latencies in the output of the planner module 114. The overwhelming majority of the planner module latencies are well within the fault detection interval of 1 second. However, there are a noticeable number of events where the latency exceeds this threshold. The longer the fault detection interval (for example, 2 seconds), the more opportunity for the planner module 114 to recover and the lower the chance of triggering the fail-safe trajectory. A fault detection interval of two seconds is estimated to reduce the fail-safe incidents to a very low level. A vehicle at 55 mph will travel nearly 25 meters every second. If the fault detection interval is too long, the vehicle will travel further before coming to a safe stop in the event of the planner module 114 excessive latency or fault. As explained above, in some embodiments, the trajectory updates 206, 208, 210, 212 may be generated every hundred milliseconds or ten times every second. Accordingly, every second where no trajectory update is received would have a significant impact on the trajectory of the vehicle.

Taking these points into consideration, embodiments switch to the fail-safe trajectory earlier, and give the planner module 114 a chance to provide updated data to the control module 116. The updated data may be used to move out of the fail-safe trajectory to a modified regular trajectory, as explained below in greater detail in connection with FIGS. 3A and 3B.

Figure 3A:
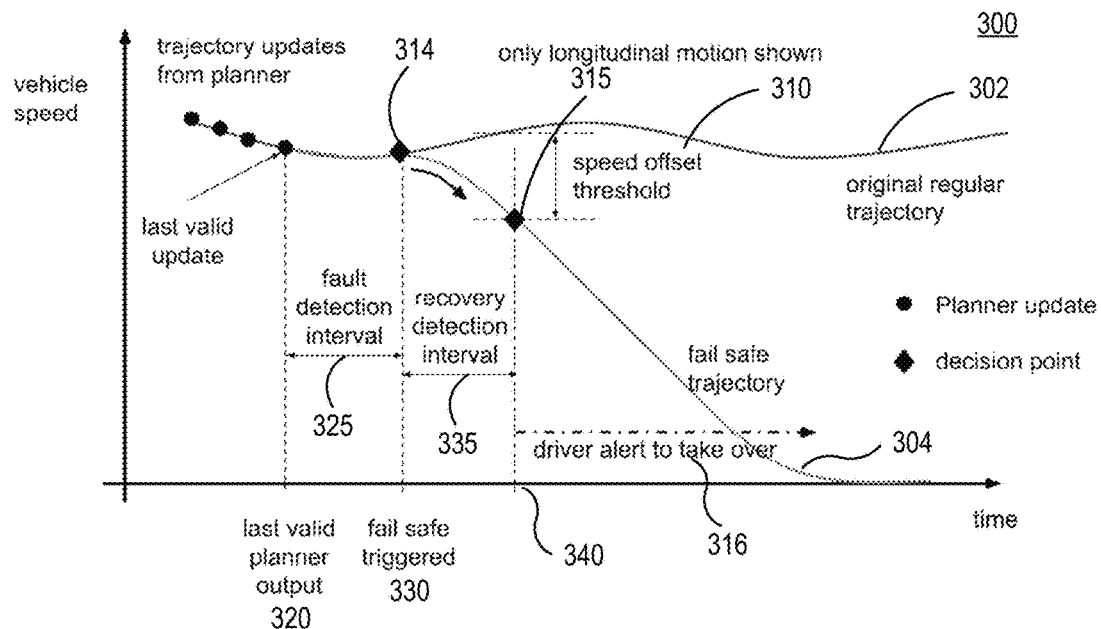
FIG. 3A illustrates a first trajectory and a second trajectory generated by a planner module of a vehicle computer, according to various embodiments.

FIG. 3A illustrates a first trajectory and a second trajectory generated by a planner module of a vehicle computer, according to various embodiments. A trajectory selection strategy 300 of a vehicle computer according to various embodiments may include a fault detection interval 325 and a recovery detection interval 335 that follows the fault detection interval 325.

According to various embodiments, the planner module 114 may receive one or more inputs from at least one or more input devices coupled to the vehicle and/or the one or more modules of the vehicle computer. The planner module 114 may determine (e.g., generate or otherwise plan) a first trajectory 302 (e.g., a regular trajectory) and a second trajectory 304 (e.g., a fail-safe trajectory) based on at least the one or more inputs. The planner module 114 publishes (e.g., transmits to the control module 116) the regular trajectory 302 and the fail-safe trajectory 304 at every update cycle. The regular trajectory and the fail-safe trajectory may be planned for the next few seconds of operation of the vehicle. According to various embodiments, the trajectories may be updated a plurality of times in one second, subject to the latencies discussed herein.

The control module 116 may receive the data associated with the first trajectory and the data associated with the second trajectory from the planner module 114 and convert the trajectories into control signals for the vehicle actuators. That is, the control module 116 may generate a first set of commands for the vehicle to follow the first trajectory, and a second set of commands for the vehicle to follow the second trajectory. During normal operating conditions (e.g., no missing data, fault or anomaly has been detected), the control module 116 may transmit the first set of commands to one or more actuators of the vehicle to control the vehicle along the first trajectory.

While operating along the first trajectory, the control module 116 may determine that updated data associated with the first trajectory is missing (e.g., a valid updated trajectory was not received from the planner module 114) at a first time 320. The control module 166 may wait during the fault detection interval 325 and decide to switch to the fail-safe trajectory 304 at the decision point 314 if no trajectory update is received during the fault detection interval. The control module 116 may provide the second set of commands to the vehicle for the vehicle to follow the second trajectory 304 (e.g., the fail-safe trajectory) at a second time 330 after the first time 320.

As further illustrated in FIG. 3A, if a valid updated trajectory is not received from the planner module 114 or the original fault is not cleared within the recovery detection interval 335, at the fourth time 340 (e.g., the end of the recovery detection interval 335), the system generates an alert 316 while continuing to provide the second set of commands to the vehicle for the vehicle to continue following the fail-safe trajectory 304. According to various embodiments, the vehicle may include an autonomous vehicle and the alert may include an alert for a driver of the vehicle to take control of the vehicle.

The fail-safe trajectory 304 overlaps with the regular trajectory 302 for at least the duration of the fault detection interval 325 and then deviates from the regular trajectory 302 starting at the second time 330, thereafter promptly slows the vehicle to a stop in lane. The fail-safe trajectory 304 assumes that the operating conditions do not change significantly and the system will not revert to normal control even if a valid planner module output is received after the recovery detection interval 335. The fail-safe trajectory 304 brings the vehicle to a full, safe stop in a predetermined amount of time depending on the speed of the vehicle at the second time 330.

FIG. 3A illustrates that when the alarm is generated at the fourth time 340, the speed of the vehicle is already reduced by the speed offset threshold 310 compared to the conventional techniques illustrated in FIG. 2. Thus, if the alert is for a driver to take control of the vehicle, the driver assumes control at a lower speed, and potentially after realizing that the vehicle was slowing down during the recovery detection interval 335.

In some embodiments, if the driver assumes the control of the vehicle, the control module 116 is no longer in charge of the vehicle and the fail-safe trajectory may not be followed until the vehicle comes to a full, safe stop. The driver may bring the vehicle to a complete stop or decide on an alternative course of action.

Embodiments allow for recovering from the fail-safe trajectory when a valid updated trajectory is received from the planner module 114 or the original fault is cleared within the recovery detection interval 335. Once the fail-safe trajectory is triggered, receipt of a trajectory update within the recovery detection interval will trigger the system to return to normal operation following a modified/updated version of the first trajectory. This is illustrated in FIG. 3B.

Figure 3B:
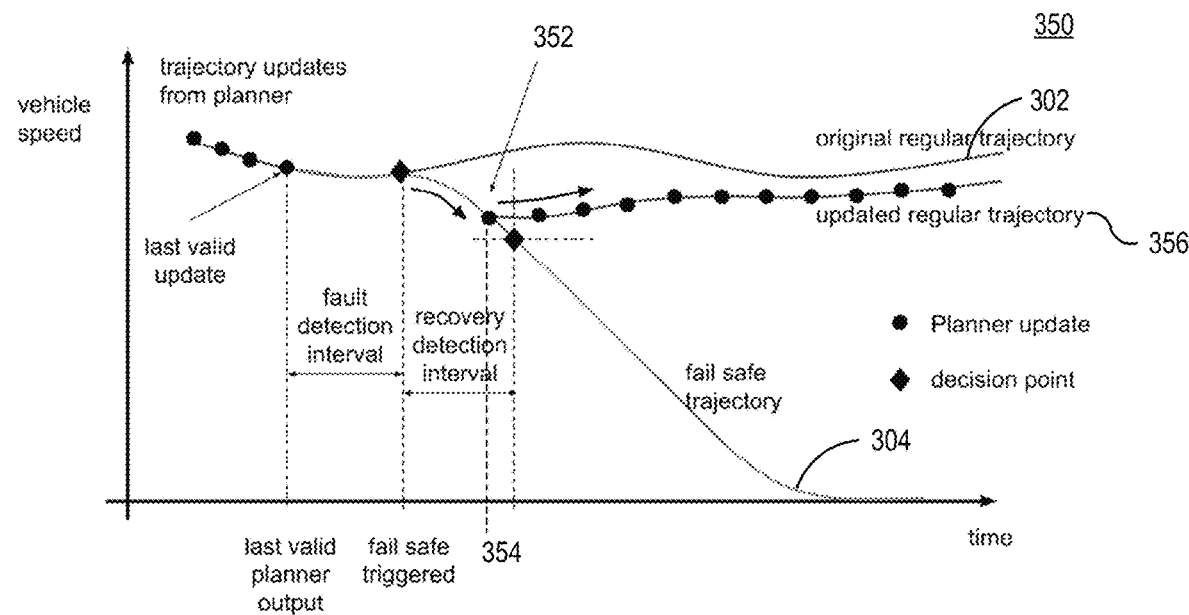
FIG. 3B illustrates an updated trajectory input received in connection with the second trajectory prior to an expiration of a recovery detection interval, according to various embodiments.

FIG. 3B illustrates an updated trajectory input received in connection with the second trajectory prior to an expiration of a recovery detection interval, according to various embodiments. A trajectory selection strategy 350 of a vehicle computer according to various embodiments may include a trajectory update during the recovery detection interval 335 that follows the fault detection interval 325.

Referring now to FIG. 3B, a valid trajectory update 352 is received from the planner module 114 or the original fault is cleared at a third time 354 within the recovery detection interval 335 (e.g. before the fourth time 340 and after the second time 330). In this case, the control module 116 controls the vehicle to follow an updated regular trajectory 356 (e.g., updated first trajectory) instead of the fail-safe trajectory 304. The updated first trajectory may be generated by the planner module 114 of the vehicle computer. According to various embodiments, the updated regular trajectory 356 may be substantially similar to the regular trajectory 302. The control module 116 may generate an updated set of commands for the vehicle to follow the updated first trajectory 356 starting at the third time 354. The control module 116 may then transmit the updated set of commands to one or more actuators of the vehicle for the vehicle to follow the updated first trajectory 356 and abandon the second trajectory (e.g., the fail-safe trajectory) 304.

In some embodiments, prior to switching to the updated regular trajectory 356, the control module may ensure that the fourth time 356 (when the valid trajectory update 352 is received from the panning module 114) is within a predetermined threshold (e.g., the recovery detection interval 335) starting at the second time 330.

In some embodiments, prior to switching to the updated regular trajectory 356, the control module may also ensure that the valid trajectory update 352 results in an updated regular trajectory 356 that is achievable based on the current actual speed of the vehicle. That is, prior to switching to the updated regular trajectory 356, the control module may also ensure that a speed associated with an initial time of the updated regular trajectory 356 is within a speed offset threshold 310, which is equal to a difference of the vehicle speed on the first trajectory and the vehicle speed on the second trajectory at the fourth time 340.

According to some exemplary embodiments, the fault detection interval 325 may be around 1.0 second, the recovery detection interval 335 may be around 1.0 second, and the speed offset threshold maybe around 2.0 m/s (4.5 MPH/s). One of ordinary skill in the art will appreciate that these parameters are provided for illustrative purposes and should not be construed limiting. These parameters may be set based on analysis of the latency distribution and functional safety concept.

FIG. 4 illustrates a flowchart for implementing a fault detection interval for taking a preventative action and a recovery detection interval for generating an alert, according to various embodiments. FIG. 4 is a flowchart of an example process 400. In some implementations, one or more process blocks of FIG. 4 may be performed by a control module 116 of a vehicle computer 100 (shown in FIG. 1).

At step 402, process 400 may include receiving, by a control module of a vehicle computer, data associated with a first trajectory and data associated with a second trajectory, where the first trajectory and the second trajectory are updated a plurality of times in one second. In some embodiments, the first trajectory may include a regular trajectory for normal operating conditions, and the second trajectory may include a fail-safe trajectory that brings the vehicle to a complete stop in a predetermined amount of time. The control module may receive the data from the planner module of the vehicle.

At step 404, process 400 may include generating, by the control module of the vehicle computer, a first set of commands for a vehicle to follow the first trajectory, and a second set of commands for the vehicle to follow the second trajectory. The control module may control the vehicle along the first or second trajectory by sending the control signals (e.g. commands) to the actuators of the vehicle. The control signals may include signals to control, for example, the steering and/or the speed of the vehicle.

At step 406, process 400 may include transmitting, by the control module of the vehicle computer, the first set of commands to one or more actuators of the vehicle for the vehicle to follow the first trajectory. As provided above, the first trajectory may be followed during normal operating conditions, when no fault, unnatural latency or anomaly is detected.

At step 408, process 400 may include determining, by the control module of the vehicle computer, that updated data associated with the first trajectory is missing at a first time. The missing trajectory update may be due to a fault, unnatural latency or anomaly.

At step 410, process 400 may include providing, by the control module of the vehicle computer, the second set of commands to the vehicle for the vehicle to follow the second trajectory at a second time after the first time. Upon detecting the fault, unnatural latency or anomaly, the vehicle computer switches the vehicle from the first trajectory (e.g., regular trajectory), to the second trajectory (e.g., the fail-safe trajectory). Accordingly, the system takes corrective action (e.g., starts to decelerate) right away, at the end of the first time period.

At step 412, process 400 includes that in the event that updated data associated with the first trajectory is received at a third time before a fourth time after the second time, controlling, by the control module of the vehicle computer, the vehicle to follow an updated first trajectory instead of the second trajectory. Embodiments allow for corrective action to be taken even after the fail-safe trajectory is activated. Accordingly, if the control module receives a trajectory update during the second time period, the control module switches out of the fail-safe trajectory and assumes an updated/modified version of the first trajectory.

At step 414, process 400 includes that in the event that updated data associated with the first trajectory is not received before the fourth time, generating, by the control module of the vehicle computer, an alert at the third time while providing the second set of commands to the vehicle for the vehicle to follow the second trajectory. In some embodiments, the vehicle may be an autonomous vehicle and the alert may include an alert for a driver of the vehicle to take control of the vehicle. Embodiments separate the corrective action and the alert generation from each other. Accordingly, if the control module does not receive a trajectory update during the second time period, the vehicle would already be following the second trajectory and slowed down from the speed would the vehicle be following the first trajectory when the alert is generated. For example, if the alert is for a driver to take over the control of the vehicle, the driver would assume control at a lower speed than the conventional systems.

Process 400 may include additional steps, such as any single steps or any combination of steps described below and/or in connection with one or more other processes described elsewhere herein. In some embodiments, controlling the vehicle to follow an updated first trajectory further may include: generating, by the control module of the vehicle computer, an updated set of commands for the vehicle to follow the updated first trajectory starting at the fourth time; and transmitting, by the control module of the vehicle computer, the updated set of commands to one or more actuators of the vehicle for the vehicle to follow the updated first trajectory and abandon the second trajectory.

In some embodiments, process 400 further includes determining, by the control module of the vehicle computer, that the fourth time is within a predetermined threshold starting at the second time.

In some embodiments, the updated first trajectory is substantially similar to the first trajectory. According to various embodiments, the first trajectory and the second trajectory may overlap for at least a period of time. In some embodiments, alone or in combination with the other embodiments, the second trajectory deviates from the first trajectory starting at least at the second time.

In some embodiments, process 400 further includes receiving, by a planner module of the vehicle computer, one or more inputs from at least one or more input devices coupled to the vehicle; determining, by the planner module of the vehicle computer, the first trajectory and the second trajectory based on at least the one or more inputs; and transmitting, by the planner module of the vehicle computer, the first trajectory and the second trajectory to the control module of the vehicle computer.

In some embodiments, alone or in combination with the other embodiments, a first time interval between the first time and the second time is about 1 second, and a second time interval between the second time and the fourth time is about 1 second.

Although FIG. 4 shows example blocks of process 400, in some embodiments, process 400 may include additional blocks, fewer blocks, different blocks, or differently arranged blocks than those depicted in FIG. 4. Additionally, or alternatively, two or more of the blocks of process 400 may be performed in parallel.

As explained in connection with FIGS. 3A-4, embodiments provide two separate thresholds: the end of the fault detection interval for taking a preventative action (e.g., slowing down the vehicle), and the end of the recovery detection interval for generating an alert. Thus, if a valid trajectory update is received before the second threshold, the system can reengage and revert back to the regular trajectory (or an updated version thereof) without having to generate an alert.

Minimal Risk Maneuver Incorporating Independent Sensor Feedback

Embodiments provide techniques for incorporating independent sensor input into the response for managing a minimal risk maneuver. Specifically, low-resolution radar sensor data (alone or in combination with an analysis thereof) is provided to a safety processor of the vehicle computer for identifying surrounding road users and objects while the vehicle is following the minimal risk maneuver.

Figure 5A:
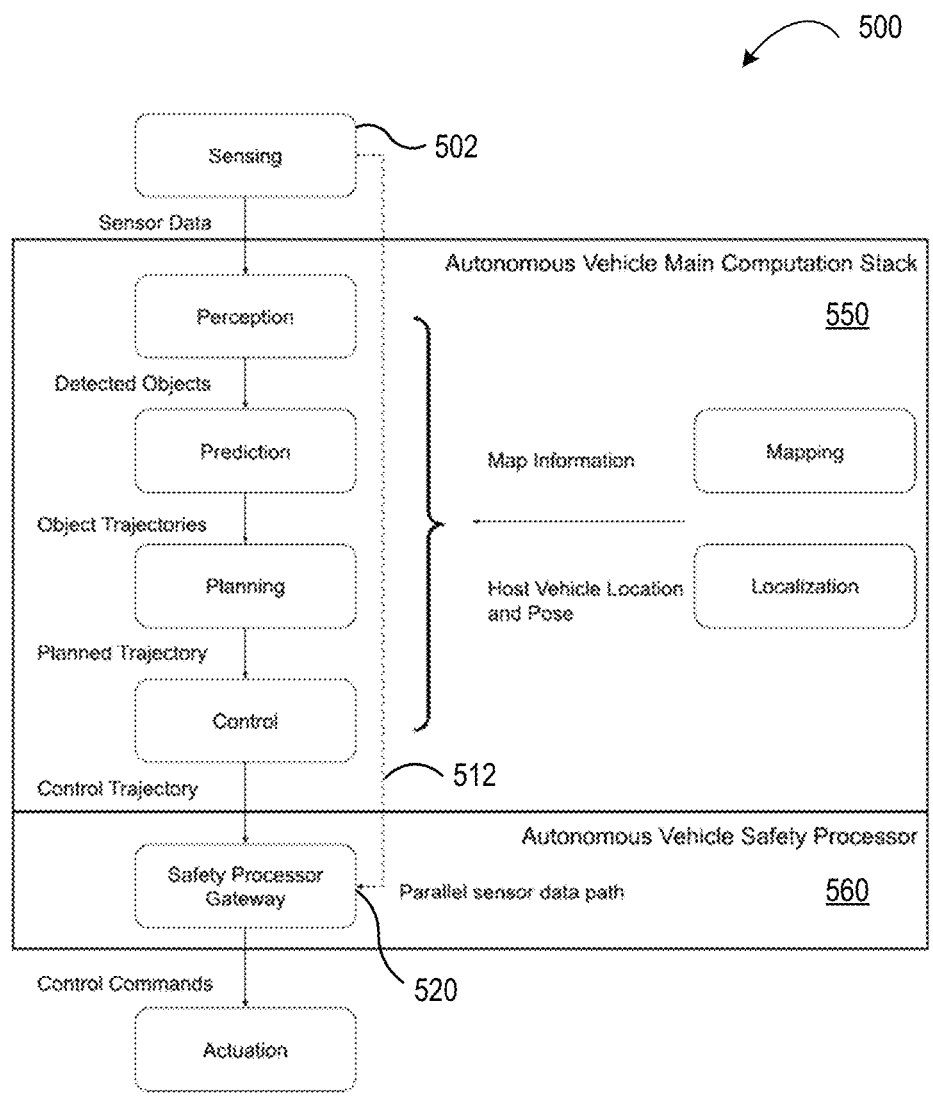
FIG. 5A illustrates components of an exemplary vehicle computer for a vehicle, according to various embodiments.

FIG. 5A illustrates components of an exemplary vehicle computer 500 for a vehicle, according to various embodiments. FIG. 5A includes similar components to FIG. 1, the description of which is provided above in connection with FIG. 1. The vehicle computer 500 include a main computation stack including one or more first (e.g., main or primary) processors 550, and one or more second (e.g., safety) processors 560.

According to various embodiments, the planning module 114 of the first processor(s) 550 may generate the regular autonomous trajectory (e.g., a first trajectory 302) and, additionally in parallel, a Minimal Risk Maneuver (MRM) trajectory (e.g., a second trajectory 304). These trajectories constitute a projection into the future of the desired driving path and speed. The first trajectory 302 and the second trajectory 304 get updated on a regular basis (e.g., several times a second). In some embodiments, the safe stop MRM trajectory may refer to a trajectory that takes the vehicle to a complete stop, possibly to the side of the road or an emergency lane. According to various embodiments, the MRM trajectory may be referred as a fail-safe trajectory and vice versa.

The safety processor 560 shown in FIG. 5A may have a high level of robustness and high level of safety integrity. According to various embodiments, the safety processor 560 may include an independent and high safety integrity micro control unit that has authority to command the actuators 108 of the vehicle. Contrary to the main computation stack 550, the safety processor 560 may not be designed to perform complex computations. For example, the safety processor 560 may not have the computational ability to process camera or other high-resolution sensor input data. For example, the safety processor 560 may not be able to use the high-resolution sensor input to modify the previously planned trajectory (e.g., a minimal risk maneuver). The safety processor gateway 520 provided at the safety processor 560 may receive the control trajectory output of the control module 116. When the control trajectory is the regular trajectory (e.g. the first trajectory 302), the safety processor gateway 520 transmits the control trajectory to the actuators 108. Under the normal operating conditions, the safety processor 560 may act as a gateway to communicate the actuator commands from the control module to the vehicle actuators (e.g., steering, brakes and throttle).

The safety processor 560 may identify a predetermined condition (e.g., a major or critical fault occurrence) while the first trajectory is being followed. In response to detection of the predetermined condition (e.g., in the faulted state or operating conditions), the safety processor 560 may implement a fail-safe trajectory or a minimal risk maneuver trajectory (e.g., the second trajectory 304) as previously communicated from the higher-level module in the main computation stack 550. In the absence of new sensory information, the second trajectory 304 is effectively blindly followed with an assumption that the surrounding environment, including other road users, does not significantly change during the several seconds it takes the vehicle to come to a safe stop following the second trajectory 304.

As used herein, the minimal risk maneuver trajectory may refer to the vehicle system response to a major or critical fault which requires the vehicle to be put into a safe state. For example, a fault with a critical component of the vehicle system may require the vehicle to stop in lane or pull over to the side of the road. The minimal risk maneuver trajectory may refer to the process of bringing the vehicle to a safe stop.

Embodiments may direct low-resolution sensor data 512 to the safety processor 560. For example, the low-resolution sensor data 512 may be received from a low-resolution sensor 502 having integrated object detection processing such as an automotive radar sensor. According to exemplary embodiments, the radar sensor may have reasonable horizontal resolution but very poor vertical resolution. An exemplary radar sensor may identify an object along the trajectory of the vehicle, however, may not differentiate between a bridge and a car. On the other hand, the radar sensor provides may have good longitudinal resolution and be very accurate at a distance to detect the relative velocity of the detected item.

The safety processor 560 may modify the second trajectory using the low-resolution sensor data 512 to avoid any new hazards along the second trajectory 304. For example, the separate sensor input 512 provided directly to the safety processor 560 can be used to command a higher level of braking (e.g., emergency braking) to avoid the hazard or reduce the severity of any resulting collision. According to various embodiments, when the control trajectory is the fail-safe trajectory or a minimal risk maneuver trajectory (e.g., the second trajectory 304), the safety processor 560 may incorporate additional input provided, for example, via a controller area network (CAN) bus. In an exemplary vehicle, all CAN bus communications may be transmitted through the safety processor gateway 520. Thus, the low-resolution sensor data 512 that is communicated via the CAN bus is transmitted through the safety processor 560 as well. As provided above, the additional input 512 may include sensor data, such as object detection data from a radar sensor 502. In some embodiments, the safety processor 560 may modify the fail-safe trajectory or the minimal risk maneuver trajectory in view of the additional input 512, and transmit the modified fail-safe trajectory/minimal risk maneuver trajectory to the actuators 108 via the safety processor gateway 520.

In some embodiments, the low-resolution sensors (e.g., the radar sensors) may be prone to detecting false objects, which may result in the safety processor 560 implementing unwanted emergency braking events during the second trajectory 304. In normal, unfaulted state, the perception module 110 may combine sensor data from multiple sources to improve detection robustness such that the sensor data input from the low-resolution sensors is augmented with additional data from high-resolution sensors. However, as explained above, the safety processor 560 has low computational capability and does not receive (and/or may not be configured to process) data from the high-resolution data sources. Embodiments may provide, in addition to the additional input 512, analysis of the additional input 512 to the safety processor 560 to reduce the false positives (e.g., false positive object detections) along the second trajectory 304.

Figure 5B:
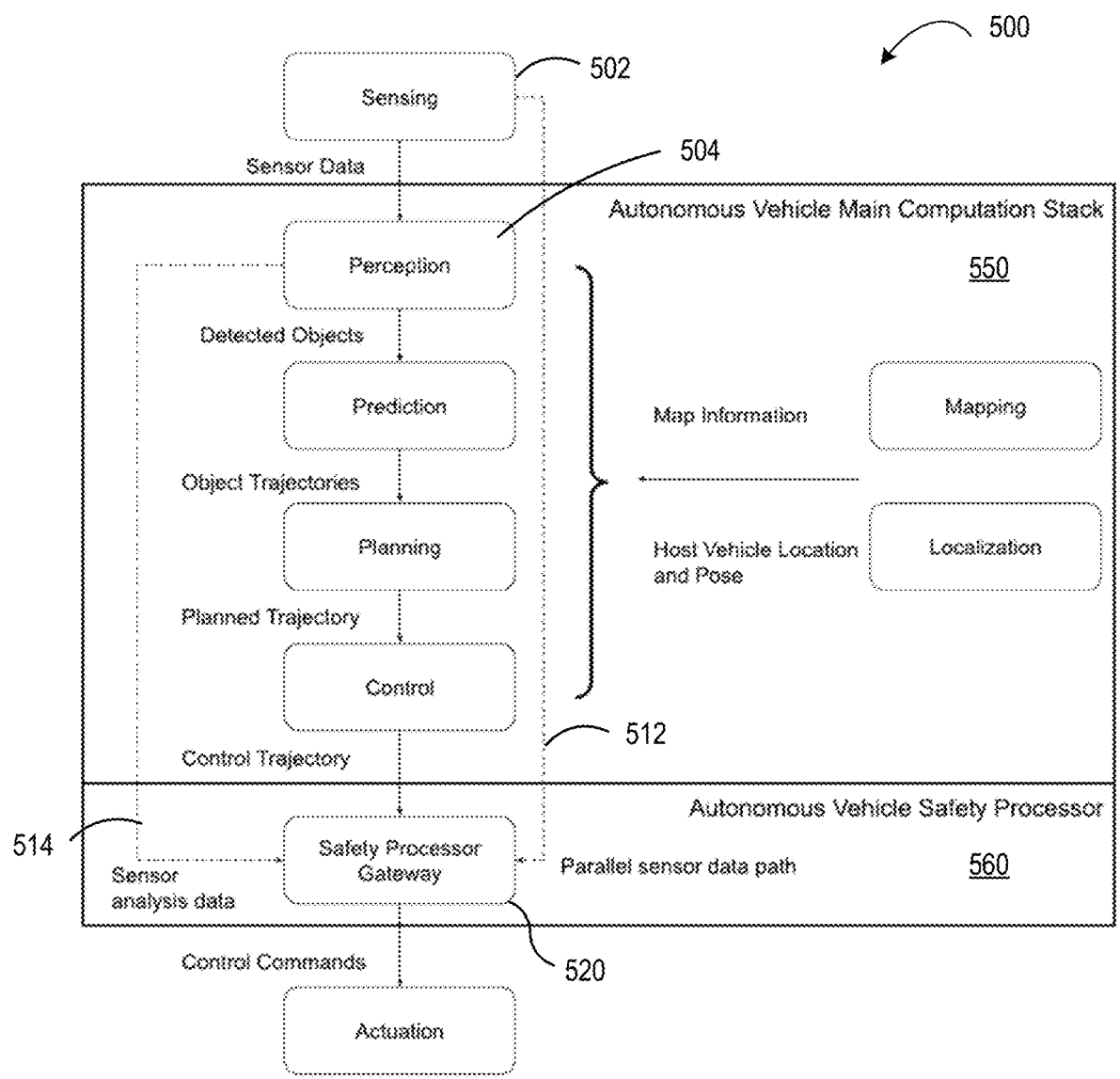
FIG. 5B illustrates the safety processor receiving the low-resolution sensor data and an analysis of the low-resolution sensor data, according to various embodiments.

FIG. 5B illustrates the safety processor 560 receiving, in addition to the low-resolution sensor data 512, an analysis 514 of the low-resolution sensor data. In some embodiments, the analysis 514 of the low-resolution sensor data may include previously identified radar 'noise' information. This information may include radar object information that is previously determined (e.g., by the main computation stack 550) not to be a threat and should consequently be ignored by the safety processor 560 in implementing the MRM trajectory. For example, the objects may be insignificant objects such as soda cans or small metallic objects, or may be objects that are not in the direct path of the vehicle such as an overhead bridge or a sign. The analysis 514 of the low-resolution sensor data may allow the safety processor 560 to filter much, if not most, of the potential false positive object detections when an MRM trajectory is executed with the parallel radar sensor data input 512. In some embodiments, the safety processor 560 may compare newly received low-resolution sensor data 512 to the analysis 514 of the low-resolution sensor data to determine previously identified non-threat objects and not react to their object signals if they are detected in the same location as previously identified. This implementation is discussed below in connection with FIG. 6A.

In some embodiments, the safety processor 560 may compare newly received low-resolution sensor data 512 to the analysis 514 of the low-resolution sensor data to determine newly identified threat objects along the second trajectory (e.g., the minimal risk maneuver trajectory) 304. The safety processor may modify the minimal risk maneuver trajectory in view of the newly received radar object data 512 and the analysis 514 of the low-resolution sensor data. The safety processor 560 may then transmit the modified minimal risk maneuver trajectory to the actuators 108. This implementation is discussed below in connection with FIG. 6B.

Figure 6A:
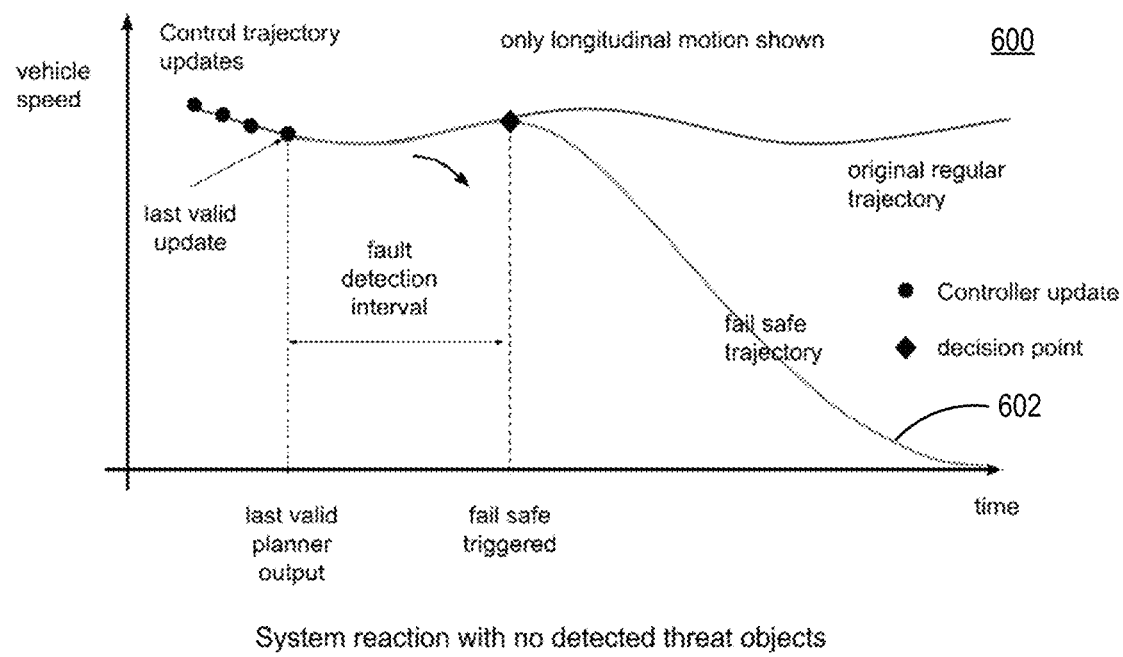
FIG. 6A illustrates a fail-safe trajectory when no additional threat objects is detected using low-resolution sensor data at a safety processor of a vehicle, according to various embodiments.

FIG. 6A illustrates a fail-safe trajectory when no additional threat objects is detected using low-resolution sensor data at a safety processor of a vehicle, according to various embodiments. As explained above, while following the MRM trajectory (e.g., the second trajectory 602), the safety processor 560 receives additional sensor data input (e.g., low-resolution sensor data), and may also receive the analysis of the low-resolution sensor data. The safety processor 560 may process the additional information and determine that there are no additional threat objects. In such embodiments, the safety processor 560 implements the MRM trajectory 602 without modifications. For example, the pre-computed analysis of the low-resolution radar sensor data may include an indication of a non-threat object based on the sensor data. The safety processor 560 may then ignore the non-threat object thereby eliminating a false positive hazard detection.

Figure 6B:
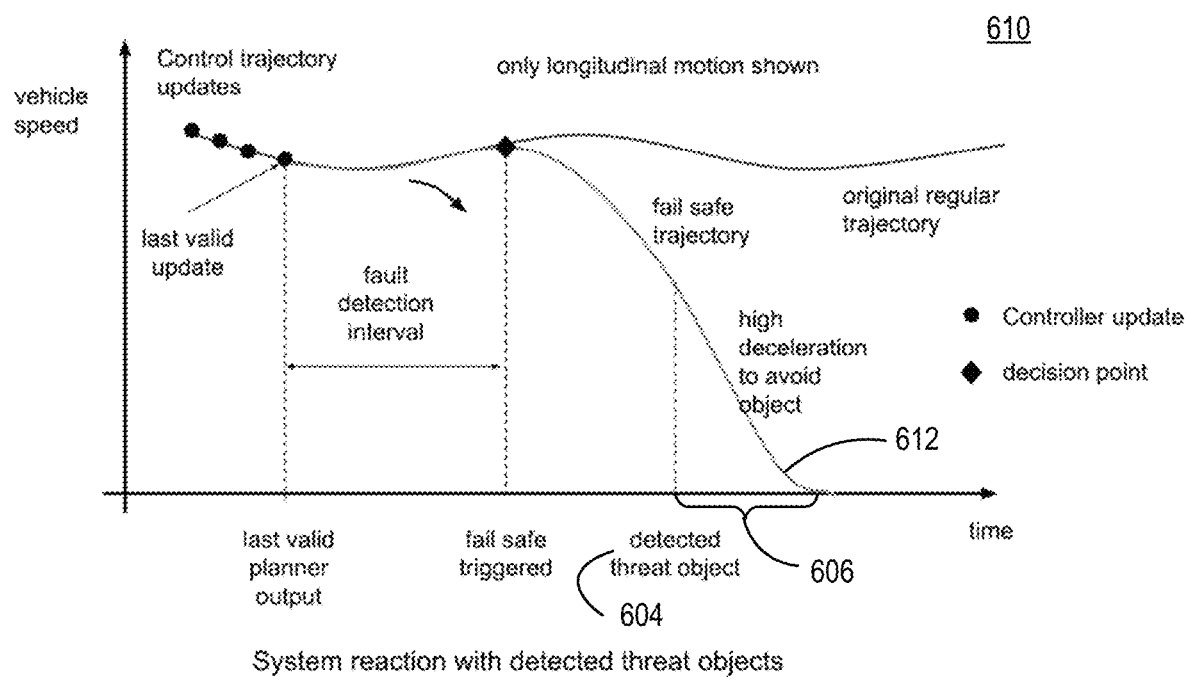
FIG. 6B illustrates a modified fail-safe trajectory in response to an additional threat object detected using low-resolution sensor data at a safety processor of a vehicle, according to various embodiments.

FIG. 6B illustrates a modified fail-safe trajectory in response to an additional threat object detected using low-resolution sensor data at a safety processor of a vehicle, according to various embodiments. In some embodiments, the safety processor 560 may process the additional information and determine that there is at least one additional hazard (e.g., threat object) 604 along the MRM trajectory. For example, the newly received radar object data 512 and the analysis 514 of the low-resolution sensor data may indicate that there is now a moving object (e.g., another vehicle, a person, or an animal) on the vehicle's path along the MRM trajectory. In such embodiments, the safety processor 560 may modify the MRM trajectory 602 based on the sensor data and the pre-computed analysis of the low-resolution radar sensor data to obtain the modified MRM trajectory 612 that avoids the hazard on the MRM trajectory. For example, the modified MRM trajectory 602 may implement high deceleration to avoid the newly detected hazard. As shown in FIG. 6B, the time for the vehicle to come to a complete stop 606 in the modified MRM trajectory 612 after detecting the treat object 604 is shorter than the time for the vehicle to come to a complete stop in the original MRM trajectory 602 illustrated in FIG. 6A.

FIG. 7 illustrates a flowchart 700 for receiving additional low-resolution sensor data at a safety processor and modifying a minimal risk maneuver by the safety processor, according to various embodiments. In some implementations, one or more process blocks (e.g., steps) of FIG. 7 may be performed by a vehicle computer 500 coupled to a vehicle.

At step 702, process 700 may include receiving, by a first processor 550 of a vehicle computer 500, data associated with a first trajectory and data associated with a second trajectory. The first trajectory and the second trajectory are updated a plurality of times in one second. According to various embodiments, the second trajectory may deviate from the first trajectory. In some embodiments, the vehicle computer 500 may be coupled to an autonomous vehicle, and the second trajectory may include a minimal risk maneuver trajectory that brings the vehicle to a safe stop in a predetermined amount of time.

At step 704, process 700 may include generating, by the first processor 550 of the vehicle computer 500, a first set of commands for a vehicle to follow the first trajectory, and a second set of commands for the vehicle to follow the second trajectory.

At step 706, process 700 may include transmitting, by the first processor 550 of the vehicle computer 500 via a safety processor 560 of the vehicle computer 500, the first set of commands to one or more actuators of the vehicle for the vehicle to follow the first trajectory. In some embodiments, the safety processor 560 may include an independent and high safety integrity micro control unit that has authority to command the actuators of the vehicle.

At step 708, process 700 may include determining, by the safety processor 560 of the vehicle computer 500, that a predetermined condition occurred for terminating the first trajectory, and switching to the second trajectory. For example, the safety processor 560 may detect a faulty state, a missing input (e.g., a valid trajectory update), or an anomaly in the functioning of the vehicle and/or the vehicle computer.

At step 710, process 700 may include providing, by the safety processor 560 of the vehicle computer 500, the second set of commands to the vehicle for the vehicle to follow the second trajectory. Once the faulty state has been detected, the safety processor 560 may switch the control from the main or regular trajectory to the fail-safe or minimal risk maneuver trajectory.

At step 712, process 700 may include receiving, by the safety processor 560 of the vehicle computer 500, sensor data while the vehicle follows the second trajectory. As explained above, the sensor data may include low-resolution sensor data such as object detection data generated by a radar sensor. According to various embodiments, the sensor data is received by the safety processor via a controller area network (CAN) bus. The safety processor 560 may not be configured to perform complex processing, however, the safety processor 560 may be configured to process the low-resolution sensor data to determine if there is a new hazard along the second trajectory and whether the second trajectory should be modified.

At step 714, process 700 may include modifying, by the safety processor 560 of the vehicle computer 500, the second trajectory based on the sensor data to obtain a modified second trajectory that avoids a hazard on the second trajectory. For example, the low-resolution sensor data provided directly to the safety processor 560 can be used to command a higher level of braking (e.g., emergency braking) to avoid the hazard or reduce the severity of any resulting collision.

In some embodiments, process 700 further includes generating, by the safety processor 560 of the vehicle computer 500, a modified second set of commands for the vehicle to follow the modified second trajectory; and transmitting, by the safety processor 560 of the vehicle computer 500, the modified second set of commands to the one or more actuators of the vehicle for the vehicle to follow the modified second trajectory.

Process 700 may include additional implementations, such as any single implementation or any combination of implementations described below and/or in connection with one or more other processes described elsewhere herein. According to various embodiments, process 700 further includes receiving, by the safety processor 560 of the vehicle computer 500 and in addition to the sensor data, precomputed analysis of the low-resolution radar sensor data associated with the sensor data while the vehicle follows the second trajectory. The safety processor 560 may then modify the second trajectory based on the sensor data and the pre-computed analysis of the low-resolution radar sensor data to obtain the modified second trajectory that avoids the hazard on the second trajectory.

In some embodiments, the pre-computed analysis of the low-resolution radar sensor data may include an indication of a non-threat object based on the sensor data, where the method further may include: ignoring, by the safety processor of the vehicle computer, the non-threat object during modifying the second trajectory based on the sensor data thereby eliminating a false positive hazard detection.

According to various embodiments, process 700 further includes receiving, by the first processor 550 of the vehicle computer 500, one or more inputs from at least one or more input devices coupled to the vehicle, where the one or more input devices include a camera or a light detection and ranging (Lidar) sensor; and generating, by the first processor 550 of the vehicle computer 500, the first trajectory and the second trajectory based on at least the one or more inputs.

Although FIG. 7 shows example blocks (e.g., steps) of process 700, in some embodiments, process 700 may include additional blocks, fewer blocks, different blocks, or differently arranged blocks than those depicted in FIG. 7. Additionally, or alternatively, two or more of the blocks of process 700 may be performed in parallel.

Figure 8:
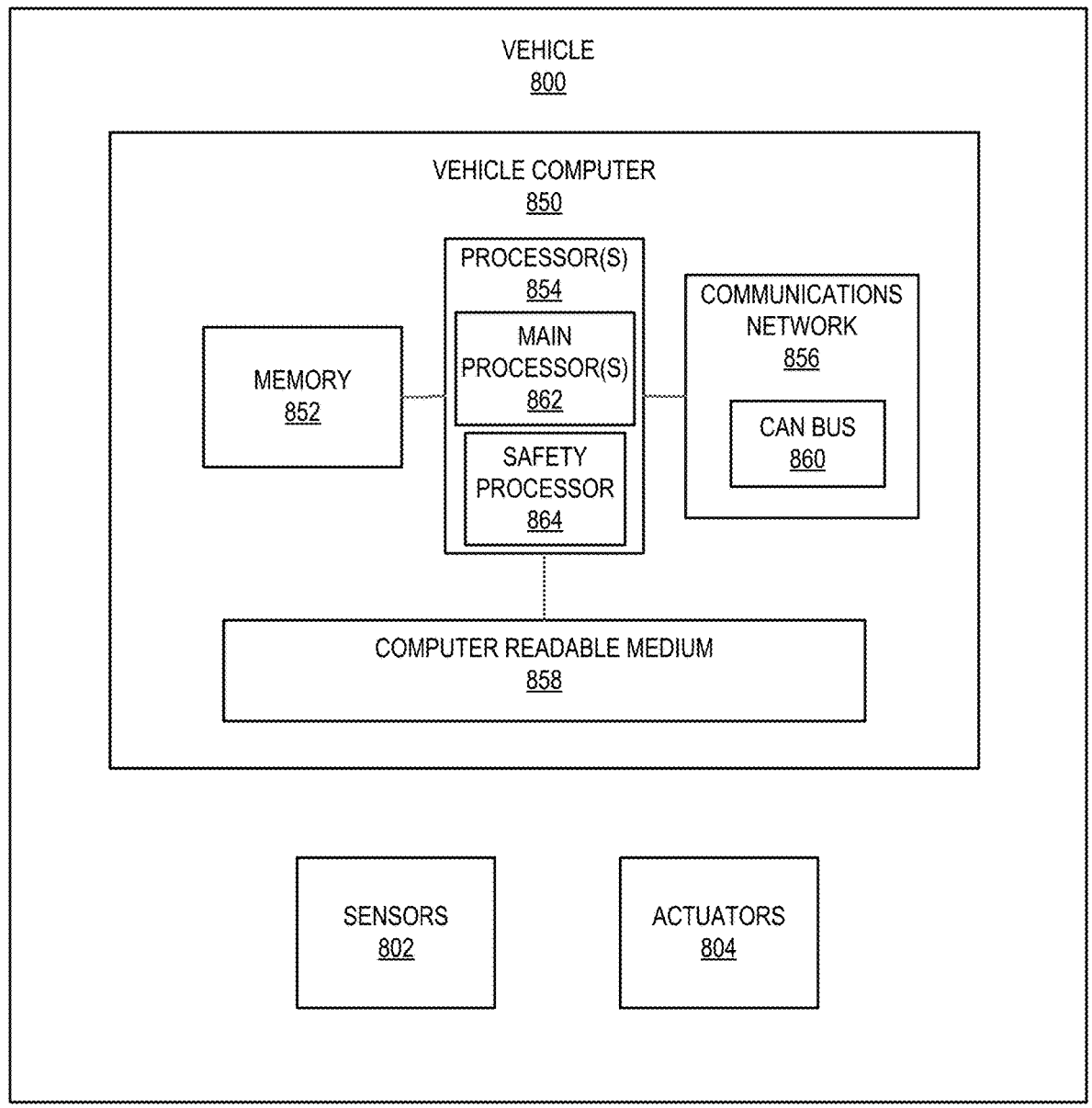
FIG. 8 illustrates a block diagram of an exemplary vehicle, according to various embodiments.

FIG. 8 illustrates a block diagram of an exemplary vehicle, according to various embodiments. The vehicle 800 may include a vehicle computer 850 (e.g., similar to vehicle computer 100 illustrated in FIG. 1 or vehicle computer 500 illustrated in FIGS. 5A-5B) that is configured to receive inputs from a plurality of sources including one or more sensors 802 coupled to the vehicle. The vehicle computer 850 is configured to generate outputs (e.g., control signals) for the one or more actuators 804 that control the vehicle 800. For example, the control signals, when executed by the actuators 804, may result in the vehicle 800 following a trajectory (e.g., a regular trajectory, a fail-safe trajectory, etc.). The actuators 804 may control a steering, speed or throttle of the vehicle.

According to various embodiments, the vehicle computer 850 may comprise processors 854 (e.g., one or more main processors 862, and one or more safety processors 564), which may be coupled to a system memory 852 and a communications network 856.

The memory 852 may be in the form of one or more memory devices (e.g., RAM, EEPROM, ROM chips), using any suitable mode of data storage. The memory 852 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s).

The communications network 856 can be any suitable communications network(s) for transferring data among, to and from the components of the vehicle computer 850. In some instances, the communication network(s) may include one or more of a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) may also include a wireless network such as, for example, a Wi-Fi or wireless local area network ("WLAN"), a wireless wide area network ("WWAN"), and/or a cellular network. According to various embodiments, the safety processor 864 may receive data from one or more sensors (e.g., low-resolution sensors) via the CAN bus 860.

The sensor 802 may include one or more of a thermal imager camera, an infrared camera, a stereo camera, a time of flight camera, an red/green/blue (RGB) camera, a 2-D camera, a 3-D camera, a 360-degree camera, an imaging radar, a 3-D radar, a 4-D radar, a short-range radar, a medium-range radar, a long-range radar, a pulse-Doppler radar, a frequency-modulated continuous-wave (FMCW) radar, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, an active sonar, a passive sonar, etc. One of ordinary skill in the art will appreciate that sensors 802 may include other types of sensors and the examples above are not meant to be exhaustive.

A computer readable medium 858 may also be operatively coupled to the processors 854 of the vehicle computer 850. The computer readable medium 858 may comprise code, executable by the processors 854, to perform a method including receiving data associated with a first trajectory and data associated with a second trajectory, wherein the first trajectory and the second trajectory are updated a plurality of times in one second; generating a first set of commands for a vehicle to follow the first trajectory, and a second set of commands for the vehicle to follow the second trajectory; transmitting the first set of commands to one or more actuators of the vehicle for the vehicle to follow the first trajectory; determining that updated data associated with the first trajectory is missing at a first time; providing the second set of commands to the vehicle for the vehicle to follow the second trajectory at a second time after the first time; when updated data associated with the first trajectory is received at a third time before a fourth time after the second time: controlling the vehicle to follow an updated first trajectory instead of the second trajectory; and when updated data associated with the first trajectory is not received before the fourth time: generating an alert at the third time while providing the second set of commands to the vehicle for the vehicle to follow the second trajectory.

Although vehicle 800 (see FIG. 8) is described and illustrated as one particular configuration of vehicle, embodiments of the disclosure are suitable for use with a multiplicity of vehicles. In some instances, embodiments of the disclosure are particularly well suited for use with long haul or short haul vehicles, including but not limited to trucks, that carry a variety of cargo.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

With reference to the appended figures, components that can include memory (e.g., memory 852) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

What is claimed is:

1. A method comprising:

receiving, by a control module of a vehicle computer, data associated with a first trajectory and data associated with a second trajectory, wherein the first trajectory and the second trajectory are updated a plurality of times in one second;

generating, by the control module of the vehicle computer, a first set of commands for a vehicle to follow the first trajectory, and a second set of commands for the vehicle to follow the second trajectory;

transmitting, by the control module of the vehicle computer, the first set of commands to one or more actuators of the vehicle for the vehicle to follow the first trajectory;

determining, by the control module of the vehicle computer, that updated data associated with the first trajectory is missing at a first time;

providing, by the control module of the vehicle computer, the second set of commands to the vehicle for the vehicle to follow the second trajectory at a second time after the first time, wherein the second trajectory diverges from the first trajectory at the second time when the vehicle starts following the second trajectory;

when updated data associated with the first trajectory is received at a third time before a fourth time after the second time:
controlling, by the control module of the vehicle computer, the vehicle to follow an updated first trajectory instead of the second trajectory; and when updated data associated with the first trajectory is not received before the fourth time:
generating, by the control module of the vehicle computer, an alert at the fourth time while providing the second set of commands to the vehicle for the vehicle to continue following the second trajectory, wherein the alert is generated when a speed of the vehicle is reduced by a speed offset threshold compared to the speed of the vehicle at the second time.

2. The method of claim 1, wherein controlling the vehicle to follow an updated first trajectory further comprises:
generating, by the control module of the vehicle computer, an updated set of commands for the vehicle to follow the updated first trajectory starting at the fourth time; and
transmitting, by the control module of the vehicle computer, the updated set of commands to one or more actuators of the vehicle for the vehicle to follow the updated first trajectory and abandon the second trajectory.

3. The method of claim 1, further comprising:
determining, by the control module of the vehicle computer, that the fourth time is a predetermined amount of time after the second time.

4. The method of claim 1, wherein the updated first trajectory is substantially similar to the first trajectory.

5. The method of claim 1, wherein the first trajectory and the second trajectory overlap for at least a period of time.

6. The method of claim 1, wherein the second trajectory deviates from the first trajectory starting at least at the second time.

7. The method of claim 1, wherein the second trajectory is a fail-safe trajectory that brings the vehicle to a complete stop in a predetermined amount of time.

8. The method of claim 1, further comprising:
receiving, by a planner module of the vehicle computer, one or more inputs from at least one or more input devices coupled to the vehicle;
determining, by the planner module of the vehicle computer, the first trajectory and the second trajectory based on at least the one or more inputs; and
transmitting, by the planner module of the vehicle computer, the first trajectory and the second trajectory to the control module of the vehicle computer.

9. The method of claim 1, wherein the vehicle is an autonomous vehicle and the alert is an alert for a driver of the vehicle to take control of the vehicle.

10. The method of claim 1, wherein a first time interval between the first time and the second time is 1 second, and a second time interval between the second time and the fourth time is 1 second.

11. A vehicle comprising:
a vehicle computer comprising one or more processors and a computer-readable medium storing instructions that, when executed by the one or more processors, cause the one or more processors to:
receive data associated with a first trajectory and data associated with a second trajectory, wherein the first trajectory and the second trajectory are updated a plurality of times in one second;
generate a first set of commands for the vehicle to follow the first trajectory, and a second set of commands for the vehicle to follow the second trajectory;
transmit the first set of commands to one or more actuators of the vehicle for the vehicle to follow the first trajectory;
determine that updated data associated with the first trajectory is missing at a first time;
provide the second set of commands to the vehicle for the vehicle to follow the second trajectory at a second time after the first time, wherein the second trajectory diverges from the first trajectory at the second time when the vehicle starts following the second trajectory;
when updated data associated with the first trajectory is received at a third time before a fourth time after the second time:
control the vehicle to follow an updated first trajectory instead of the second trajectory; and
when updated data associated with the first trajectory is not received before the fourth time:
generate an alert at the fourth time while providing the second set of commands to the vehicle for the vehicle to continue following the second trajectory, wherein the alert is generated when a speed of the vehicle is reduced by a speed offset threshold compared to the speed of the vehicle at the second time.

12. The vehicle of claim 11, further comprising
one or more actuators that control the vehicle,
wherein the instructions for controlling the vehicle to follow an updated first trajectory further comprises instructions that, when executed by the one or more processors, cause the one or more processors to:
generate an updated set of commands for the vehicle to follow the updated first trajectory starting at the third time; and
transmit the updated set of commands to the one or more actuators of the vehicle for the vehicle to follow the updated first trajectory and abandon the second trajectory.

13. The vehicle of claim 11, wherein the computer-readable medium further stores instructions that, when executed by the one or more processors, cause the one or more processors to:
determine that the fourth time is a predetermined amount of time after the second time.

14. The vehicle of claim 11, wherein the updated first trajectory is substantially similar to the first trajectory.

15. The vehicle of claim 11, wherein the first trajectory and the second trajectory overlap for at least a period of time, and the second trajectory deviates from the first trajectory starting at least at the second time.

16. The vehicle of claim 11, wherein the second trajectory is a fail-safe trajectory that brings the vehicle to a complete stop in a predetermined amount of time.

17. The vehicle of claim 11, further comprising:
one or more input devices,
wherein the computer-readable medium further stores instructions that, when executed by the one or more processors, cause the one or more processors to:
receive one or more inputs from at least one or more input devices coupled to the vehicle; and determine the first trajectory and the second trajectory based on at least the one or more inputs.

18. The vehicle of claim 11, wherein the vehicle is an autonomous vehicle and the alert is an alert for a driver of the vehicle to take control of the vehicle.

19. The vehicle of claim 11, wherein a first time interval between the first time and the second time is 1 second, and a second time interval between the second time and the fourth time is 1 second.

20. A non-transitory computer-readable medium storing instructions that, when executed by one or more processors, cause the one or more processors to:
   receive data associated with a first trajectory and data associated with a second trajectory, wherein the first trajectory and the second trajectory are updated a plurality of times in one second;
   generate a first set of commands for a vehicle to follow the first trajectory, and a second set of commands for the vehicle to follow the second trajectory;
   transmit the first set of commands to one or more actuators of the vehicle for the vehicle to follow the first trajectory;
   determine that updated data associated with the first trajectory is missing at a first time;
   provide the second set of commands to the vehicle for the vehicle to follow the second trajectory at a second time after the first time, wherein the second trajectory diverges from the first trajectory at the second time when the vehicle starts following the second trajectory;
   when updated data associated with the first trajectory is received at a third time before a fourth time after the second time:
      control the vehicle to follow an updated first trajectory instead of the second trajectory; and
   when updated data associated with the first trajectory is not received before the fourth time:
      generate an alert at the fourth time while providing the second set of commands to the vehicle for the vehicle to continue following the second trajectory, wherein the alert is generated when a speed of the vehicle is reduced by a speed offset threshold compared to the speed of the vehicle at the second time.

* * * * *